United States Patent
Kurosawa et al.

(10) Patent No.: US 10,740,129 B2
(45) Date of Patent: Aug. 11, 2020

(54) DISTINGUISHING PORTIONS OF OUTPUT FROM MULTIPLE HOSTS

(71) Applicant: International Business Machines Corporation, Armonk, NY (US)

(72) Inventors: Ryoji Kurosawa, Tokyo (JP); Xiangning Liu, Tokyo (JP); Koichi Nishitani, Kanagawa-ken (JP); Fumihiko Terui, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 387 days.

(21) Appl. No.: 14/731,440

(22) Filed: Jun. 5, 2015

(65) Prior Publication Data

US 2016/0357750 A1 Dec. 8, 2016

(51) Int. Cl.
*G06F 9/455* (2018.01)
*G06F 16/9038* (2019.01)
*G06F 3/0484* (2013.01)

(52) U.S. Cl.
CPC ........ *G06F 9/45558* (2013.01); *G06F 3/0484* (2013.01); *G06F 16/9038* (2019.01); *G06F 2009/45579* (2013.01)

(58) Field of Classification Search
CPC ...... G06F 11/1446; G06F 17/27; G06F 9/547; G06F 17/246; G06F 3/005; G06F 16/248; G06F 9/45558
See application file for complete search history.

(56) References Cited

U.S. PATENT DOCUMENTS

| 7,246,174 | B2 | 7/2007 | Sciandra et al. | |
|---|---|---|---|---|
| 7,735,081 | B2 | 6/2010 | Robinson et al. | |
| 7,949,938 | B2 | 5/2011 | Champion et al. | |
| 8,209,408 | B1 | 6/2012 | Huang et al. | |
| 8,726,337 | B1 | 5/2014 | Curry et al. | |
| 8,929,287 | B1 | 1/2015 | Huang et al. | |
| 2010/0268578 | A1* | 10/2010 | Fushimi | G06F 17/30867 705/7.29 |
| 2013/0246048 | A1* | 9/2013 | Nagase | G06F 40/129 704/9 |
| 2013/0262419 | A1 | 10/2013 | Kilian et al. | |
| 2013/0318099 | A1* | 11/2013 | Sano | H04N 21/25866 707/748 |
| 2014/0033177 | A1 | 1/2014 | Chang et al. | |
| 2014/0201735 | A1 | 7/2014 | Kannan et al. | |
| 2014/0280193 | A1* | 9/2014 | Cronin | G06F 17/30539 707/741 |

(Continued)

OTHER PUBLICATIONS

Nanni, Dan, "How to diff and merge files or directories on Linux", Xmodulo, Last updated on: Oct. 2, 2013, pp. 1-11, <http://xmodulo.com/diff-merge-files-directories-linux.html>.

(Continued)

*Primary Examiner* — Mariela Reyes
*Assistant Examiner* — Courtney Harmon
(74) *Attorney, Agent, or Firm* — Stephen R. Yoder

(57) ABSTRACT

An apparatus includes a receiving unit operable to receive a plurality of outputs from a plurality of hosts, a comparing unit operable to compare the plurality of outputs, and a display processing unit operable to generate a display in which portions of the plurality of outputs are distinguished based on a comparison result of the comparing unit.

10 Claims, 14 Drawing Sheets

(56) References Cited

U.S. PATENT DOCUMENTS

| | | | | |
|---|---|---|---|---|
| 2014/0297628 A1* | 10/2014 | Tsuji | ................ | G06F 17/30687 707/723 |
| 2015/0127565 A1* | 5/2015 | Chevalier | .............. | G06Q 10/00 705/319 |
| 2015/0195229 A1* | 7/2015 | Schaefer | ................ | H04L 51/08 709/206 |
| 2016/0092837 A1* | 3/2016 | Panigrahi | .............. | G06F 16/435 705/319 |
| 2016/0335260 A1* | 11/2016 | Convertino | ....... | G06F 16/24578 |

OTHER PUBLICATIONS

Stephan, K., "Merge output from multiple servers", parallel-ssh PSSH, Parallel SSH Tools, Issue 47, Google Project Hosting, Mar. 6, 2011, pp. 1-3, <https://code.google.com/p/parallel-ssh/issues/detail?id=47>.

Willadsen, Kai; "What is Meld?", Copyright © 2011-2012, Kai Willadsen, Hosted by GitHub, p. 1, <http://meldmerge.org/>.

"Comparing and merging user interface revisions from multiple people", User Experience Stack Exchange is a question and answer site for user experience researchers and experts, edited on: Jul. 25, 2014, site design / logo © 2015 stack exchange inc; user contributions licensed under cc by-sa 3.0 with attribution required rev 2015.6.3.2631, pp. 1-3, <http://ux.stackexchange.com/questions/61948/comparing-and-merging-user-interface-revisions-from-multiple-people>.

"Using WinMerge as the default diff/merge tool in Visual Studio 2012/2013", Degree Consulting Group, Dec. 2, 2013 by Joakim, pp. 1-4, <http://blog.degree.no/2013/12/using-winmerge-as-the-default-diffmerge-tool-in-visual-studio-2012/>.

Kurosawa et al., "Distinguishing Portions of Output From Multiple Hosts", U.S. Appl. No. 15/145,881, filed May 4, 2016, 51 pages.

Appendix P, List of IBM Patents or Patent Applications Treated as Related, 2 pages, dated May 5, 2016.

* cited by examiner

300a

Host 1

```
# echo 'same result'
same result hostname
host1.dummy.com service myservice start
Starting myservice:   [  OK  ]
```

Host 2

```
# echo 'same result'
same result hostname
host2.dummy.com service myservice start
Starting myservice:   [  OK  ]
```

Host 3

```
# echo 'same result'
same result hostname
host3.dummy.com service myservice start
Starting myservice:    [  OK  ]
```

Host 4

```
# echo 'same result'
same result hostname
host4.dummy.com service myservice start
Starting myservice:    [ FAILED ]
```

DISTINGUISHING PORTIONS OF OUTPUT FROM MULTIPLE HOSTS

BACKGROUND OF THE INVENTION

The present invention relates generally to the field of virtualized computing, and more particularly to distinguishing portions of output generated by multiple hosts.

With the development of virtualization technology and computer parallelization, results of a command executed on multiple hosts must be verified. It is possible to issue commands to the multiple hosts, such as by utilizing scripting. However, it is time-consuming and expensive to compare and verify the outputs from all of the hosts executing the commands, especially when there is a large number of hosts.

SUMMARY

A first aspect of the present invention may include an apparatus comprising a receiving unit, a comparing unit, and a display processing unit. The receiving unit is operable to receive a plurality of outputs from a plurality of hosts. The comparing unit is operable to compare the plurality of outputs. The display processing unit is operable to generate a display in which portions of the plurality of outputs are distinguished based on a comparison result of the comparing unit.

A second aspect of the present invention may include a computer-implemented method performed by the apparatus of the first aspect. A third aspect of the invention may include a computer program product comprising a non-transitory computer readable storage medium having program instructions embodied therewith, the program instructions executable by a computer to cause the computer to perform the method of the second aspect.

In a third aspect of the present invention, a method, a computer program product, and a system for generating a comprehensive user interface for simultaneous access to multiple computers includes: issuing a first command to a set of computers, receiving a set of outputs corresponding to replies by the set of computers to the first command, assigning a score to each output of the set of outputs by comparing the each output with remaining outputs in the set of outputs, generating a first display in a first view area for the set of outputs based on the score, and generating a second display in a second view area for an individual output in the set of the outputs based on the score. The score is based on a calculated degree of difference for each portion in each output of the set of outputs.

The summary clause does not necessarily describe all necessary features of the embodiments of the present invention. The present invention may also be a sub-combination of the features described above. The above and other features and advantages of the present invention will become more apparent from the following detailed description taken in conjunction with the accompanying drawings.

BRIEF DESCRIPTION OF THE DRAWINGS

FIG. 3A-3D are first screenshot views showing information that is generated by and/or helpful in understanding embodiments of the present invention;

FIG. 9B is a fourth screenshot view showing information that is generated by and/or helpful in understanding embodiments of the present invention;

FIG. 10 is a fifth screenshot view showing information that is generated by and/or helpful in understanding embodiments of the present invention;

FIG. 13 is an eighth screenshot view showing information that is generated by and/or helpful in understanding embodiments of the present invention;

FIG. 14A is a ninth screenshot view showing information that is generated by and/or helpful in understanding embodiments of the present invention;

DETAILED DESCRIPTION

Hereinafter, example embodiments of the present invention will be described. The example embodiments shall not limit the claims, and the combinations of features described in the example embodiments are not necessarily essential to the invention. Advantages and/or effects described in a given example embodiment are not necessarily required in the other embodiments.

Figure 1:
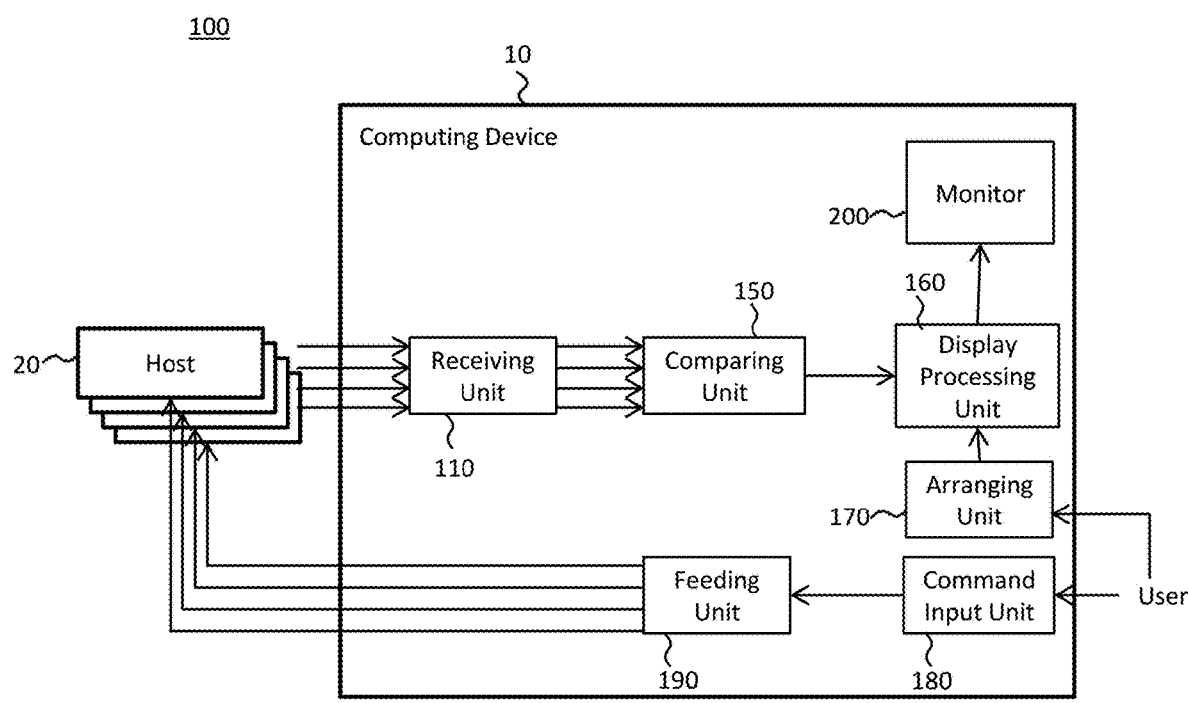
FIG. 1 is a schematic view of a first embodiment of a system according to the present invention.

Referring to FIG. 1, Computer system 100 includes computing device 10 that compares the output received from each host of a plurality of hosts 20 executing the same command or commands, and generates a display in which portions of the plurality of outputs are distinguished based on a comparison result, a weighting method, a calculation of degrees of difference, etc. Computing device 10 comprises receiving unit 110, comparing unit 150, display processing 160, arranging unit 170, input unit 180, feeding unit 190, and monitor 200.

The receiving unit 110 is connected to a plurality of hosts 20 through wires or wirelessly, and receives an output from each host of the plurality of hosts 20, which may be computers, servers, virtual machines, etc., in any combination. The outputs may be console outputs, outputs from command line interpreters, real and/or emulated hardware, firmware, and/or software, such as Operating Systems (OSs), applications, and/or other programs. The receiving unit 110 may receive the outputs from the plurality of hosts 20. The receiving unit 110 may directly or indirectly connect to the comparing unit 150 and provide the comparing unit 150 with the received outputs. The receiving unit 110 can be a modem, a LAN interface, a wireless LAN interface, or any other wired or wireless communication interface.

The comparing unit 150 may compare the plurality of outputs. For example, the comparing unit 150 may calculate a degree of difference for each portion of each output. The comparing unit 150 may directly or indirectly connect to the display processing unit 160 and provide the display processing unit 160 with the result of the comparison. The comparing unit 150 may be a circuit, a shared or dedicated computer readable medium storing computer readable program instructions executed by a shared or dedicated processor, etc.

The display processing unit 160 may generate a view area including a display in which portions of the plurality of outputs are distinguished based on a comparison result of the comparing unit 150. For example, the display processing unit 160 may generate a display in which an identical portion is distinguished from a non-identical portion of the plurality of outputs based on the comparison result of the comparing unit. The display processing unit 160 may generate a display of an identical portion and/or a non-identical portion of each of the plurality of outputs in separate views. The display processing unit 160 may generate separate view areas including the display of the plurality of outputs, where each view area corresponds to a window, a tab, or any other delineation of area in an operating system.

The display processing unit 160 may generate an overall view area that may include a display of a portion of the plurality of outputs that is emphasized. The display of the non-identical portion may indicate differences of the plurality of outputs by overlaying text in the non-identical portion of the plurality of outputs. The display of the emphasized portion may indicate non-uniform degrees of difference among corresponding portions of each output. Differences in text among corresponding portions of each output may be overlaid in the display of the emphasized portion of the plurality of outputs. The overall view area may correspond to one window, tab, or any other delineation of area in an operating system.

The overall view area may further include a display of a portion of the plurality of outputs that is de-emphasized. The display of the identical portion may indicate that the plurality of outputs are substantially the same. The display processing unit 160 may generate a common view of an identical portion of the plurality of outputs, which contains the distinguishable display of the identical portion. The display of the de-emphasized portion may indicate uniform degrees of difference among corresponding portions of each output. Differences in text among corresponding portions of each output may be overlaid in the display of the portion of the plurality of outputs. Details of a display that may be generated by the display processing unit 160 are explained below. The display processing unit 160 may directly or indirectly connect to monitor 200, and provide the monitor 200 with the generated view area. The display processing unit 160 may be a circuit, a shared or dedicated computer readable medium storing computer readable program instructions executable by a shared or dedicated processor, etc. In some embodiments, the shared computer readable medium and/or shared processor of a display processing unit may be the same as the shared computer readable medium and/or processor of a comparing unit.

The arranging unit 170 may receive a selection of a subset of outputs from the plurality of outputs from a user and arranges a subset view area for displaying the subset of the plurality of outputs in which portions of the plurality of outputs are distinguished. The arranging unit 170 may directly or indirectly connect to the display processing unit 160, and provide the subset view area to the display processing unit 160. In response, the display processing unit 160 may generate the subset view area including a display of the identical portion and/or the non-identical portion of the subset of the plurality of outputs, in the subset view area. In response, the display processing unit 160 may generate the subset view area including a display of the subset of the plurality of outputs in which individual portions of the plurality of outputs may be emphasized or de-emphasized. In other embodiments, an arranging unit may arrange a subset view area for displaying an identical portion and/or a non-identical portion of a subset of the plurality of outputs, wherein the subset of the plurality of hosts is selected by a user through an input unit, such as a mouse, keyboard, etc. The arranging unit 160 may be a circuit, a shared or dedicated computer readable medium storing computer readable program instructions executable by a shared or dedicated processor, etc. In some embodiments, the shared computer readable medium and/or shared processor of an arranging unit may be the same as the shared computer readable medium and/or processor of a comparing unit and/or a display processing unit.

The command input unit 180 may input text received from a user through an input unit, such as a mouse, keyboard, etc. The text may be input through an overall view area or a single view area. The command input unit 180 may provide a command that the user inputs in the overall view area. The command input unit 180 may directly or indirectly connect to the feeding unit 190, and provide the text to the feeding unit 190. The command input unit 160 may be a circuit, a shared or dedicated computer readable medium storing computer readable program instructions executable by a shared or dedicated processor, etc. In some embodiments, the shared computer readable medium and/or shared processor of a command input unit may be the same as the shared computer readable medium and/or processor of a comparing unit, a display processing unit, and/or an arranging unit.

The feeding unit 190 may feed the text from the user to each host of the plurality of the hosts 20. The feeding unit 190 may feed the command that the user inputs through the command input unit 180 to each host of the plurality of the hosts 20, may feed the command to a subset of the plurality of hosts 20, such as the hosts 20 associated with the outputs in the subset selected by the user through the arranging unit 170, or may feed the command to a single host. The feeding unit 190 may directly or indirectly connect to the plurality of hosts 20. The feeding unit 190 may feed the command to the plurality of hosts 20 simultaneously, and the plurality of hosts 20 may execute the command simultaneously, in response to receiving the command. The feeding unit 160 may be a circuit, a shared or dedicated computer readable medium storing computer readable program instructions executable by a shared or dedicated processor, etc. In some embodiments, the shared computer readable medium and/or shared processor of a feeding unit may be the same as the shared computer readable medium and/or processor of a comparing unit, a display processing unit, an arranging unit, and/or a command input unit.

The monitor 200 may display one or more view areas generated by the display processing unit 160. The monitor 200 may display the overall view area including the display in which portions of the plurality of outputs are distinguished. The monitor 200 may be a cathode ray tube (CRT), a liquid crystal display (LCD), a light emitting diode (LED) screen, etc.

By displaying the plurality of outputs in which portions of the plurality of outputs are distinguished, a user may recognize a host of interest or a deviant portion of the output of a specific host.

Figure 2:
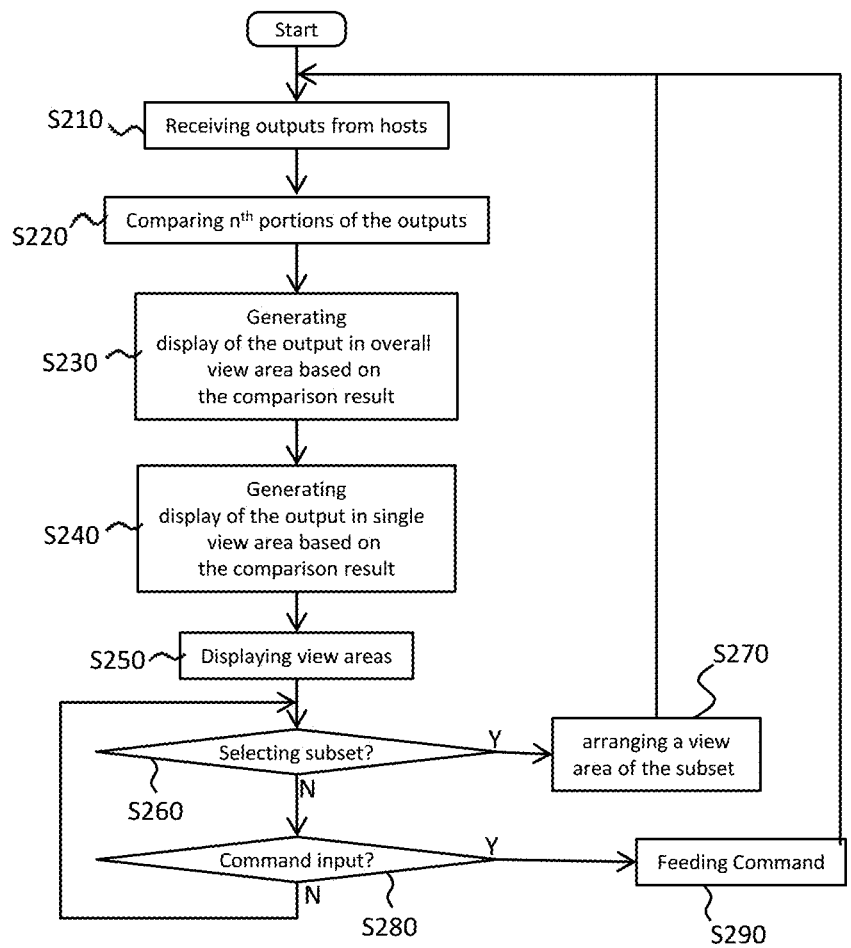
FIG. 2 is a flowchart of a first embodiment method according to the present invention.

FIG. 2 shows a flowchart for process 200 according to an embodiment of the invention. In this embodiment, a computing device, such as computing device 10 of FIG. 1, performs a method comprising S210-S290.

At S210, a receiving unit, such as the receiving unit 110 of FIG. 1, may receive a plurality of outputs from a plurality of hosts, such as hosts 20 of FIG. 1.

FIGS. 3A-D show screenshots 300a-d respectively with outputs from the plurality of hosts, according to an embodiment of the present invention. FIG. 3A shows screenshot 300a with the output from one of the plurality of hosts, "Host 1," which is a virtual machine. In this embodiment, the output of Host 1 indicates that the user had input the commands "echo 'same result'", "hostname", and "service myservice start.", and indicates that "same result", "host1.dummy.com", and "Starting myservice:[OK]" are portions of the output in response to the commands, respectively.

FIG. 3B shows screenshot 300b with the output from a second host, "Host 2", which is a virtual machine. In this embodiment, the output of Host 2 indicates that the user had input the commands "echo 'same result'", "hostname", and "service myservice start", and indicates that "same result", "host2.dummy.com", and "Starting myservice:[OK]" are portions of the output in response to the commands, respectively.

FIG. 3C shows screenshot 300c with the output from a third host, "Host 3", which is a virtual machine. In this embodiment, the output of Host 3 indicates that the user had input the commands "echo 'same result'", "hostname", and "service myservice start", and indicates that "same result", "host3.dummy.com", and "Starting myservice:[OK]" are portions of the output in response to the commands, respectively.

FIG. 3D shows screenshot 300d with the output from a fourth host, "Host 4", which is a virtual machine. In this embodiment, the output of Host 4 indicates that the user had input the commands "echo 'same result'", "hostname", and "service myservice start", and indicates that "same result", "host4.dummy.com", and "Starting myservice:[FAILED]" are portions of the output in response to the commands, respectively.

As shown in FIGS. 3A-3C, the outputs from Hosts 1-3 are almost the same. Only the host number in the "#hostname" portion is different due to the difference of the identification of the host. Meanwhile, while the "#echo 'same result'" portion and the "#hostname" portion of the output from Host 4 is almost the same as the other hosts, in that the "#hostname" portion differs only by the host number, but the "#service myservice start" portion of the output of Host 4 is different from the other hosts. In particular, while the output of other hosts show "[OK]" in the "#service myservice start" portions, the output of Host 4 shows "[FAILED]" in the "#service myservice start" portion.

At S220, a comparing unit, such as the comparing unit 150 of FIG. 1, may compare the plurality of outputs. The comparing unit may provide a display processing unit, such as the display processing unit 160 of FIG. 1, with the result of the comparison.

Figure 4:
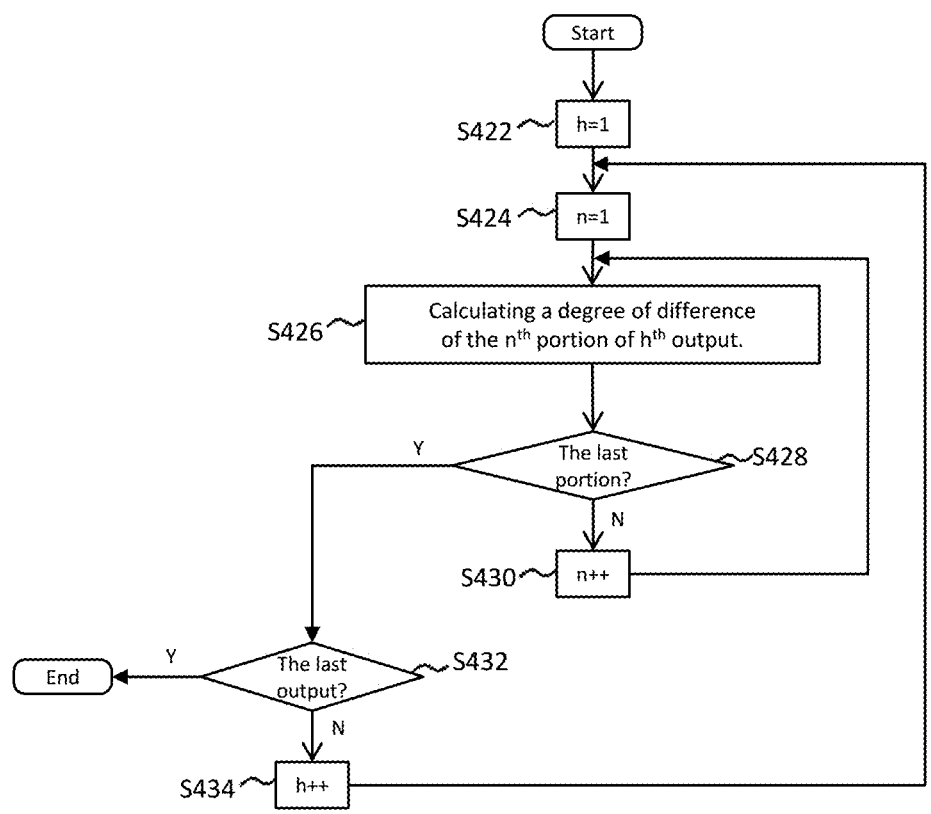
FIG. 4 is a flowchart of a second embodiment method according to the present invention.

FIG. 4 shows a detailed flowchart of process 400 comparing $n^{th}$ portions of the outputs, such as S220 in FIG. 2, according to an embodiment of the invention. A comparing unit, such as the comparing unit 150 of FIG. 1, may perform a comparison by executing S422-S434 as shown in FIG. 4.

At S422, the comparing unit sets a variable "h," indicating a host number, to "1."

At S424, the comparing unit sets a variable "n" to "1." The variable "n" indicates the number of portions in an output. For example, "n" may be a paragraph number, a portion number, a line number, a response, a combination of a command and a response, etc.

At S426, the comparing unit calculates a degree of difference for each portion of each output of the plurality of outputs. The comparing unit may calculate a degree of difference for the subject portion (i.e., $n^{th}$ portion) of the subject output (i.e., $h^{th}$ output), and a corresponding portion (i.e., $n^{th}$ portion) of each of the other outputs. In some embodiments, the degree of difference of the subject portion of the subject output represents an amount of outputs in which the corresponding portion is different from the subject portion of the subject output, and the comparing unit may calculate a degree of difference by determining an amount of hosts having an $n^{th}$ portion of output that is different from the $n^{th}$ portion of the subject output.

Figure 5:
FIG. 5 is a table showing information that is generated by and/or helpful in understanding embodiments of the present invention.

FIG. 5 shows table 500 with the results of a calculation of degrees of difference, such as the calculation performed at S426 of FIG. 4, according to an embodiment of the invention. The table shown in FIG. 5 shows the degree of differences of each portion of each output. In this embodiment, a comparing unit has set a score of difference to "0" for identical corresponding portions. In other words, nothing is added to the degree of difference of a subject portion for each corresponding portion of the other outputs that is the same as the subject portion of the subject output.

In some embodiments, a comparing unit may ignore a space in portions when calculating a degree of difference, and may determine that two corresponding portions are the same when the corresponding portions are identical except for the existence of one or more spaces. In other embodiments, a comparing unit may set a score of difference to a value between 0-1 for corresponding portions that are identical except for the existence of one or more spaces. In other words, 0.5 is added to the degree of difference of a subject portion for each corresponding portion of the other outputs that is identical, except for the existence of one or more spaces, to the subject portion of the subject output.

In the embodiment of FIG. 5, the comparing unit has set the score of difference to "1" for non-identical corresponding portions. In other words, 1 is added to the degree of difference of a subject portion for each corresponding portion of the other outputs that is not the same as the subject portion of the subject output. In this embodiment, the comparing unit has calculated the sum of the scores of difference resulting from the comparison of the each portion of each output to each corresponding portion of each other output. The sum is the degree of difference.

Since the "echo 'same result'" portion of the output of each of Hosts 1-4 is the same, the comparing unit has calculated the degree of difference of the "echo 'same result'" portion for each host to be 0. In doing so, the comparing unit has determined the score of difference of the "echo 'same result'" portion of the output of Host 1 to be 0 in comparison to the "echo 'same result'" portion of the output of Host 2, 0 in comparison to the "echo 'same result'" portion of the output of Host 3, and 0 in comparison to the "echo 'same result'" portion of the output of Host 4. The comparing unit then calculated the degree of difference of the "echo 'same result'" portion of Host 1 to be 0 (0+0+0).

Since the "hostname" portion of the output of each of Hosts 1-4 is different, the comparing unit has calculated the degree of difference of the "hostname" portion for each host to be 3 (1+1+1). In doing so, the comparing unit has determined the score of difference of the "hostname" portion of the output of Host 1 to be 1 in comparison to the "hostname" portion of the output of Host 2, 1 in comparison to the "hostname" portion of the output of Host 3, and 1 in comparison to the "hostname" portion of the output of Host 4. The comparing unit then calculated the degree of difference of the "hostname" portion of Host 1 to be 3 (1+1+1).

Since the "service myservice start" portion of the output of each of Hosts 1-3 is the same, and the "service myservice start" portion of the output of Host 4 is different, the comparing unit has calculated the degree of difference of the "service myservice start" portion for each of Hosts 1-3 as 1 (0+0+1), and the degree of difference of the "service myservice start" portion for Host 4 as 3 (1+1+1). In doing so, the comparing unit has determined the score of difference of the "service myservice start" portion of the output of Host 1 to be 0 in comparison to the "service myservice start" portion of the output of Host 2, 0 in comparison to the "service myservice start" portion of the output of Host 3, and 1 in comparison to the "service myservice start" portion of the output of Host 4. The comparing unit then calculated the degree of difference of the "service myservice start" portion of Host 1 to be 1 (0+0+1).

At S428, the comparing unit determines whether the subject portion is the last portion of the subject output. For example, if the output of the $h^{th}$ host includes 3 portions, then the comparing unit determines whether the variable "n" is 3. If the subject portion is the last portion, then the comparing unit moves to S432, and if not, then the comparing unit moves to S430.

At S430, the comparing unit adds 1 to the variable "n."

At S432, the comparing unit determines whether the subject output is the last output. For example, if there are 4 hosts, then the comparing unit determines whether the variable "h" is 4. If the subject output is the last output, then the comparing unit ends comparing $n^{th}$ portions of the outputs, and if not, then the comparing unit moves to S434.

At S434, the comparing unit adds 1 to the variable "h." In some embodiments, after comparing $n^{th}$ portions of the outputs, the comparing unit moves to generating a view area including a display of the outputs, such as S230 in FIG. 2.

At S230, a display processing unit, such as the display processing unit 160 in FIG. 1, may generate an overall view area including a display of the plurality of outputs in which individual portions of the plurality of outputs may be emphasized or de-emphasized based on the degrees of difference calculated at 8120. In other embodiments, the display processing unit may generate a display of an identical portion and/or a non-identical portion of the plurality of outputs in an overall view area.

Figure 6:
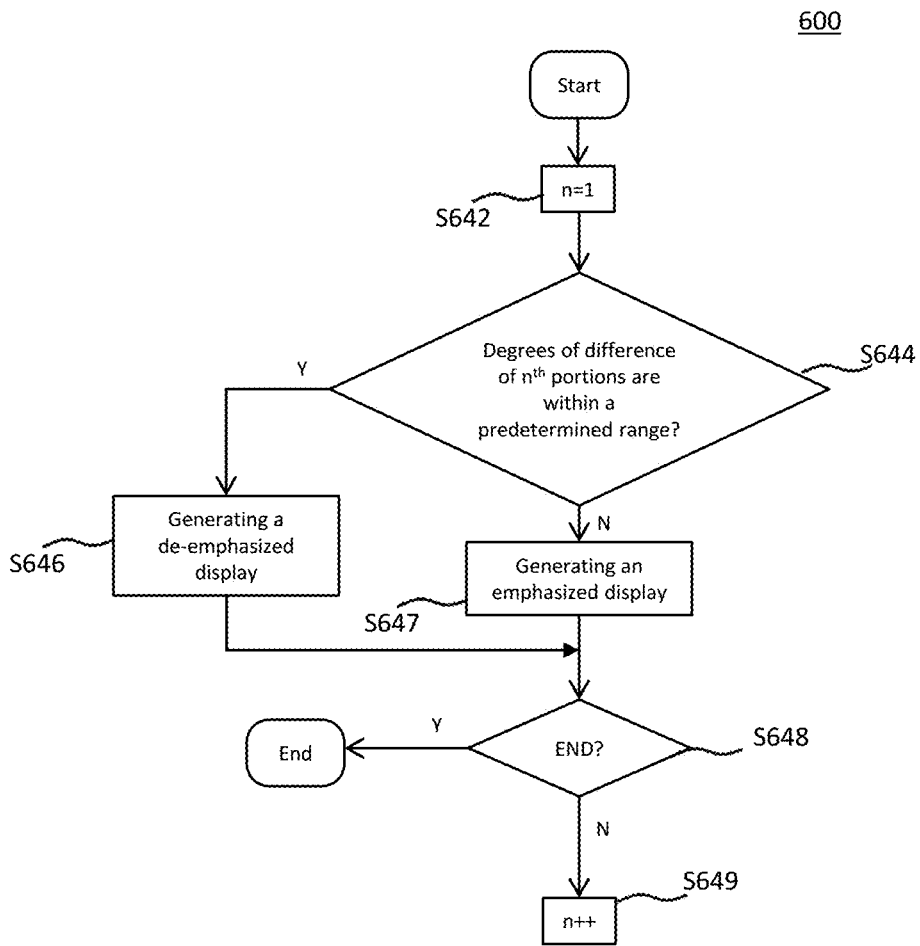
FIG. 6 is a flowchart of a third embodiment method according to the present invention.

FIG. 6 shows a detailed flowchart of process 600 generating an overall view area including a display of the outputs, such as S230 in FIG. 2, according to an embodiment of the invention. A display processing unit, such as the display processing unit 160 in FIG. 1, may generate the overall view area including a display of the outputs by executing S642-649 shown in FIG. 6.

At S642, the display processing unit sets variable "n" to "1."

At S644, the display processing unit determines whether the degrees of difference of the $n^{th}$ portions of the plurality of outputs are within a predetermined range. For example, the display processing unit may determine whether the degrees of difference of the $n^{th}$ portions of the output of all of the hosts are the same, or whether the degrees of difference are within a predetermined range. In some embodiments, a display processing unit may determine whether the standard deviation of the degrees of difference of the $n^{th}$ portions of the outputs is less than a predetermined value.

When using the degrees of difference from the embodiment of FIG. 5, the display processing unit may find that the degrees of difference of the "echo 'same result'" portions of the output of Hosts 1-4 are the same. The display processing unit may determine that the range of degrees of difference is 0. Assuming a predetermined range of 1, the range is within the predetermined range. The display processing unit would find that the degrees of difference of the "service myservice start" portions of the output of Hosts 1-4 are not the same. The display processing unit may determine that the range of degrees of difference is 2. Assuming a predetermined range of 1, the range is not within the predetermined range.

If the determination of S644 is positive, then the display processing unit 160 moves to S646, and if negative, then the display processing unit moves to S647.

At S646, the display processing unit generates a display of the $n^{th}$ portions of the outputs that is de-emphasized in the overall view area. Differences in text among the $n^{th}$ portions of the outputs may be overlaid in the display of the $n^{th}$ portions of the outputs. In some embodiments, the display processing unit may generate a common view of the $n^{th}$ portions of the plurality of outputs, within the overall view area. The display processing unit may generate the display for the common view, by selecting the $n^{th}$ portions of the plurality of outputs, and superimposing the selected $n^{th}$ portions of the plurality of outputs in the overall view area.

At S647, the display processing unit generates a display of the $n^{th}$ portions of the outputs that is emphasized in the overall view area. Differences in text among the $n^{th}$ portions of the outputs may be overlaid in the display of the $n^{th}$ portions of the outputs.

At S648, the display processing unit determines whether the $n^{th}$ portion is the last portion of the outputs. If the $n^{th}$ portion is the last portion, then the display processing unit ends generating the overall view area, and if not, then the display processing unit moves to S649.

At S649, the display processing unit adds 1 to the variable "n." Then the display processing unit moves to S644. After generating the overall view area, the display processing unit generates single view areas, such as in S240 in FIG. 2.

At S240 in FIG. 2, the display processing unit may generate a plurality of single view areas, each single view area including a display of an individual output in which individual portions of the individual output may be emphasized or de-emphasized. In other embodiments, the display processing unit may generate a display of an identical portion and/or a non-identical portion of each of the plurality of outputs in each of a plurality of single view areas. In doing so, the display processing unit generates a single view area including a display of an individual output in which individual portions of the individual output may be emphasized or de-emphasized by assigning display attributes to each portion of the individual output in the single view area based on the degree of difference.

In some embodiments, the display processing unit may deemphasize a portion of an individual output if the degree of difference of the portion is below a threshold, and emphasize the portion if the degree of difference of the portion is equal to or larger than the threshold.

Figure 7:
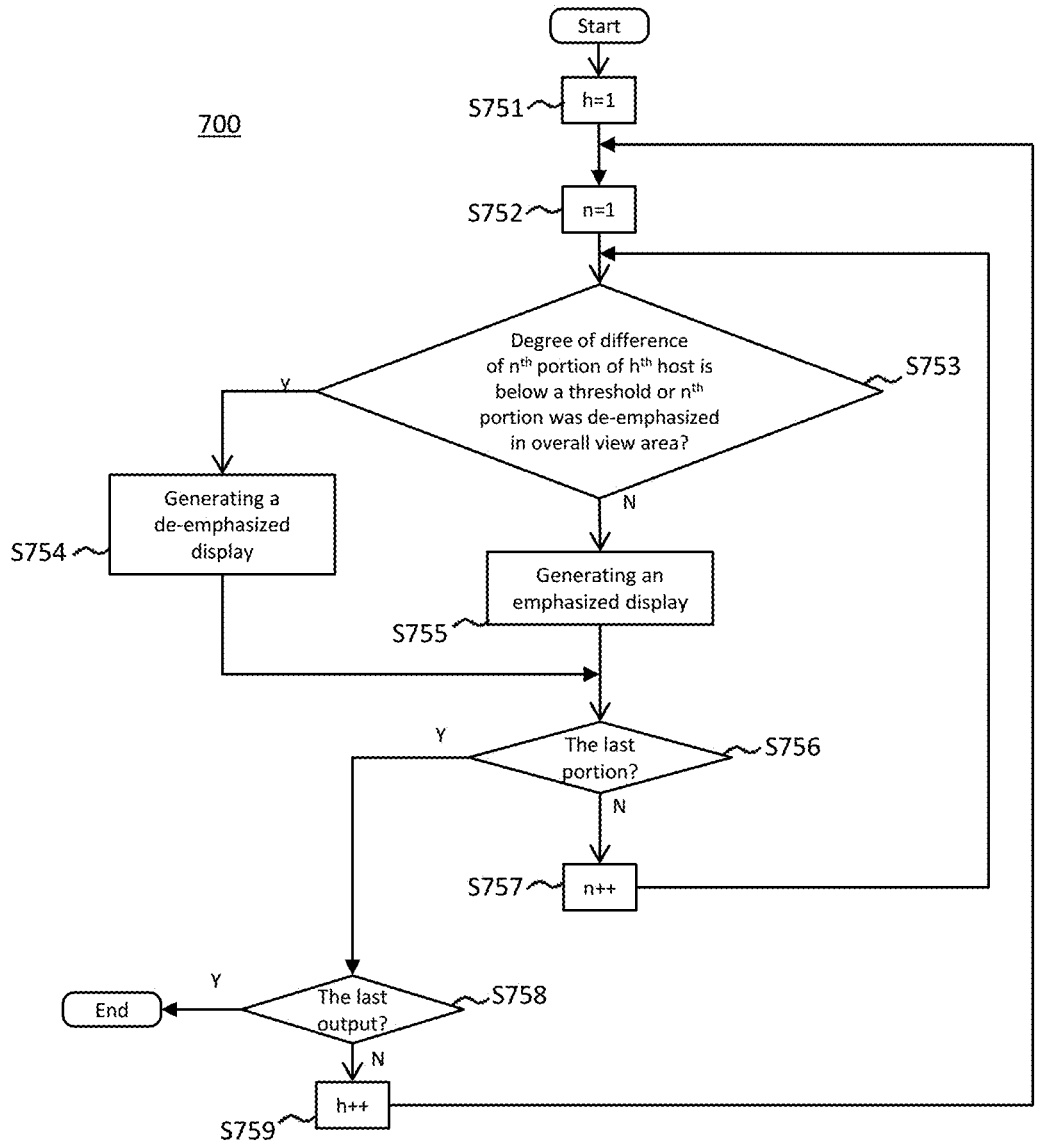
FIG. 7 is a flowchart of a fourth embodiment method according to the present invention.

FIG. 7 shows a detailed flowchart of process 700 for the generation of a plurality of single view areas, such as S240 in FIG. 2, according to an embodiment of the invention. A display processing unit, such as the display processing unit 160 in FIG. 1, may generate the plurality of single view areas by executing S751-S759 indicated in FIG. 7.

At S751, the display processing unit sets variable "h" to "1."

At S752, the display processing unit sets variable "n" to "1."

At S753, the display processing unit determines whether the degree of difference of the $n^{th}$ portion of the $h^{th}$ output is below a threshold, and/or the $n^{th}$ portion of the outputs was de-emphasized in the overall view area. The display processing unit may set the threshold based on the number of hosts and/or an average of the degrees of difference of the $n^{th}$ portions of the plurality of outputs. In some embodiments, the display processing unit may determine whether the degree of difference of the $n^{th}$ portion of the $h^{th}$ output is below half of the number of hosts. In other embodiments, the display processing unit may determine whether the degree of difference of the $n^{th}$ portion of the $h^{th}$ output is below an average of the degrees of difference of the $n^{th}$ portions of the outputs.

When using the degrees of difference from the embodiment of FIG. 5, the display processing unit may set the threshold to 2, which is half of the number of hosts. The display processing unit may then find that degree of difference of the "service myservice start" portion of the output of Host 1 is less than 2, which is below the threshold, and that the "service myservice start" portion was de-emphasized in the overall view. Therefore, the determination of S753 with respect to the "service myservice start" portion of the output of Host 1 would be positive. The display processing unit may find that degree of difference of the "hostname" portion of the output of Host 4 is more than 2, which is above the threshold, and that the "hostname" portion was de-emphasized in the overall view. Therefore, the determination of S753 with respect to the "hostname" portion of the output of Host 4 would be positive. The display processing unit may find that the degree of difference of the "service myservice start" portion of the output of Host 4 is more than 2, which is not below the threshold, and that the "service myservice start" portion was emphasized in the overall view. Therefore, the determination of S753 with respect to the "service myservice start" portion of the output of Host 4 would be negative.

If the determination of S753 is positive, then the display processing unit moves to S754, and if negative, then the display processing unit moves to S755.

At S754, the display processing unit generates a display of the $n^{th}$ portion of the output of the $h^{th}$ host that is de-emphasized in the single view of the $h^{th}$ host.

At S755, the display processing unit generates a display of the $n^{th}$ portion of the output of the $h^{th}$ host that is emphasized in the single view of the $h^{th}$ host. In one embodiment, the display processing unit may emphasize the $n^{th}$ portion of the output of the $h^{th}$ host by assigning display attributes to the $n^{th}$ portion in the single view of the $h^{th}$ host.

At S756, the display processing unit determines whether the $n^{th}$ portion is the last portion of the $h^{th}$ host. If it is the last portion of the $h^{th}$ host, then the display processing unit moves to S758, and if not, then the display processing unit moves to S757.

At S757, the display processing unit adds 1 to the variable "n." Then the display processing unit moves to S753.

At S758, the display processing unit determines whether the $h^{th}$ host is the last host. If the $h^{th}$ host is the last host, then the display processing unit ends generating the plurality of single view areas, and if not, then the display processing unit moves to S759.

At S759, the display processing unit adds 1 to the variable "h." Then the display processing unit moves to S752. After generating the plurality of single view areas, the display processing unit causes a monitor to display the generated display for the overall view area and/or the single view area, such as in S250 in FIG. 2.

At S250 in FIG. 2, the display processing unit may cause a monitor, such as the monitor 200 in FIG. 1, to display the overall view area and/or the single view area.

Figure 8:
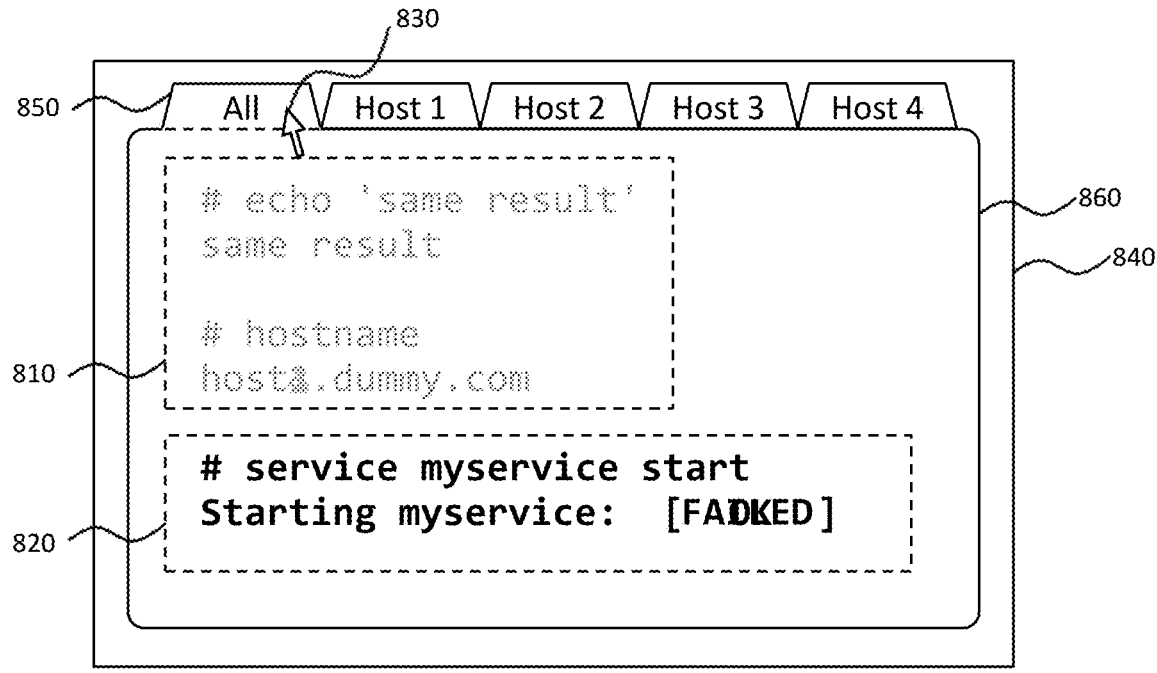
FIG. 8 is a second screenshot view showing information that is generated by and/or helpful in understanding embodiments of the present invention.

FIG. 8 shows a window 840 including an overall view area 860, such as the overall view area generated at S240 in FIG. 2, according to an embodiment of the invention. Window 840 also includes tab 850, which can be selected by cursor 830. A display processing unit, such as the display processing unit 160 in FIG. 1, may generate a window comprising tabs for selecting view areas. In response to a selection of a tab, the view area corresponding to the selected tab is displayed in the window on the monitor. In FIG. 8, tab 850, which is for the overall view area, has been selected, and the overall view area 860 is displayed in the window 840.

A dashed box 810 indicates a common view including a display of de-emphasized portions of the outputs, and a dashed box 820 indicates an emphasized portion of the outputs. In some embodiments, a display processing unit may cause a monitor to display the text of a de-emphasized portion of the outputs using light characters, small characters, thin characters, or any other characters that blend in with the background of the window. In other embodiments, a display processing unit may cause a monitor to display the text of a de-emphasized portion of the outputs using normal characters, as long as all emphasized portions of the outputs are not displayed using normal characters. The display processing unit may overlay differences in text among the corresponding portions of individual outputs in the display of de-emphasized portions of the outputs.

In some embodiments, a display processing unit may cause a monitor to display the text of an emphasized portion of the outputs using heavy characters, large characters, bold characters, or any other characters that stand out from the from the background of the window. In addition, the display processing unit 160 may display the non-identical portion by overlaying text in the non-identical portion of the plurality of outputs. Alternatively, the display processing unit may overlay differences in text among corresponding portions of individual outputs in the display of emphasized portions of the outputs.

In FIG. 8, the display processing unit has determined that the degrees of difference of the "echo 'same result'" portion and the "host name" portion of the output of each host are the same, and generates a de-emphasized display in the dashed box 810 for these portions. The display processing unit has determined that the degrees of difference of the "service myservice start" portion of the output of each host are not the same, and generates an emphasized display in the dashed box 820 for this portion. The display processing unit has overlaid "FAILED" and "OK" in the "service myservice start" portion, and displays the portion using bold characters. In response to a user selecting a tab for single view area (e.g., "Host 1") through an input unit, such as a mouse, keyboard, etc., the display processing unit causes the monitor to display the view area corresponding to the tab.

Figure 9A:
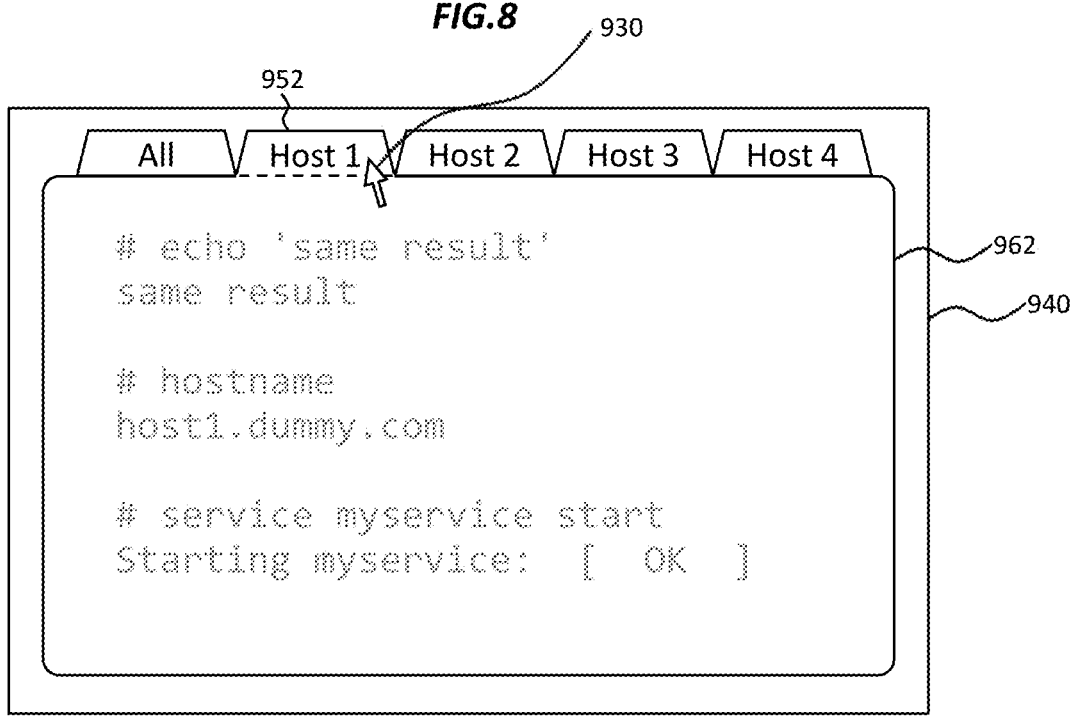
FIG. 9A is a third screenshot view showing information that is generated by and/or helpful in understanding embodiments of the present invention.
Figures 9B, 10:
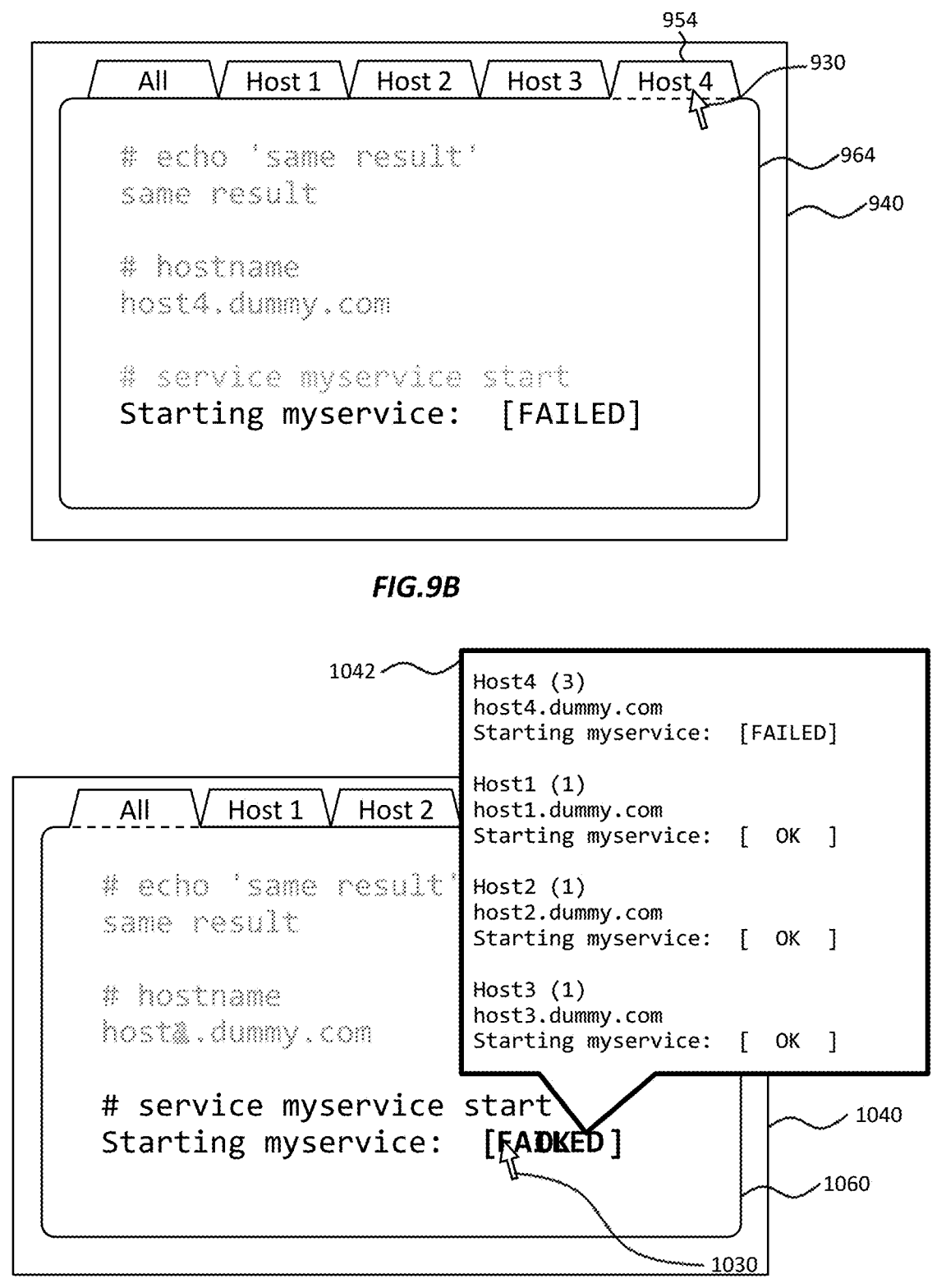

FIGS. 9A-B show single view areas, such as areas that may be generated at S754 in FIG. 7, according to an embodiment of the invention. In FIG. 9A, a tab 952 for "Host 1" has been selected by cursor 930, and a single view area 962 for "Host 1" is displayed in a window 940. A display processing unit, such as the display processing unit 160 in FIG. 1, has determined that each portion of the output of Host 1 either corresponds to a portion that was not emphasized in a corresponding overall view, or has a degree of difference determined to be below a threshold. Thus, the display processing unit has displayed all of the portions in the single view area 962 for Host 1 using light characters.

In FIG. 9B, a tab 954 for "Host 4" has been selected by the cursor 930, and a single view area 964 for "Host 4" is displayed in the window 960. The display processing unit has determined that each of the "echo 'same result'" and the "hostname" portions of the output of Host 4 either corresponds to a portion that was not emphasized in the overall view, or has a degree of difference determined to be below the threshold. The display processing unit has determined that the "service myservice start" portion of the output of Host 4 both corresponds to a portion that was emphasized in a corresponding overall view, and has a degree of difference that was determined not to be below the threshold. Thus, the display processing unit has displayed the "echo 'same result'" and the "hostname" portions using light characters, and has displayed the "service myservice start" portion using bold and heavy characters, in the single view area 964 for Host 4.

At S250 in FIG. 2, the display processing unit may generate a view area including a display of a portion of each output corresponding to a portion of the outputs in an overall view area in response to the corresponding portion of the outputs in the overall view area being selected. For example, the display processing unit may generate a follow-up window including a display of the corresponding portion of each output.

FIG. 10 shows a follow-up window 1042, according to an embodiment of the invention. In response to the user hovering a cursor 1030 over a portion in an overall view 1060 in a window 1040 through an input unit such as a mouse, a display processing unit, such as the display processing unit 160 in FIG. 1, may generate the follow-up window 1042.

In FIG. 10, the display processing unit has generated the follow-up window 1042 of the "service myservice start" portion of the outputs. The follow-up window 1042 displays the "service myservice start" portions of the outputs of Hosts 1-4. The display processing unit may generate a display of the "service myservice start" portions of the outputs in descending order of the degree of difference of each portion. In other embodiments, the display processing unit may generate a display of a non-identical portion by separately showing text in the identical portion of each of the plurality of outputs in response to the non-identical portion being selected. The "service myservice start" portion of the output of Host 4 has the largest degree of difference, and is therefore displayed at the top of the follow-up window 1042.

Figure 11:
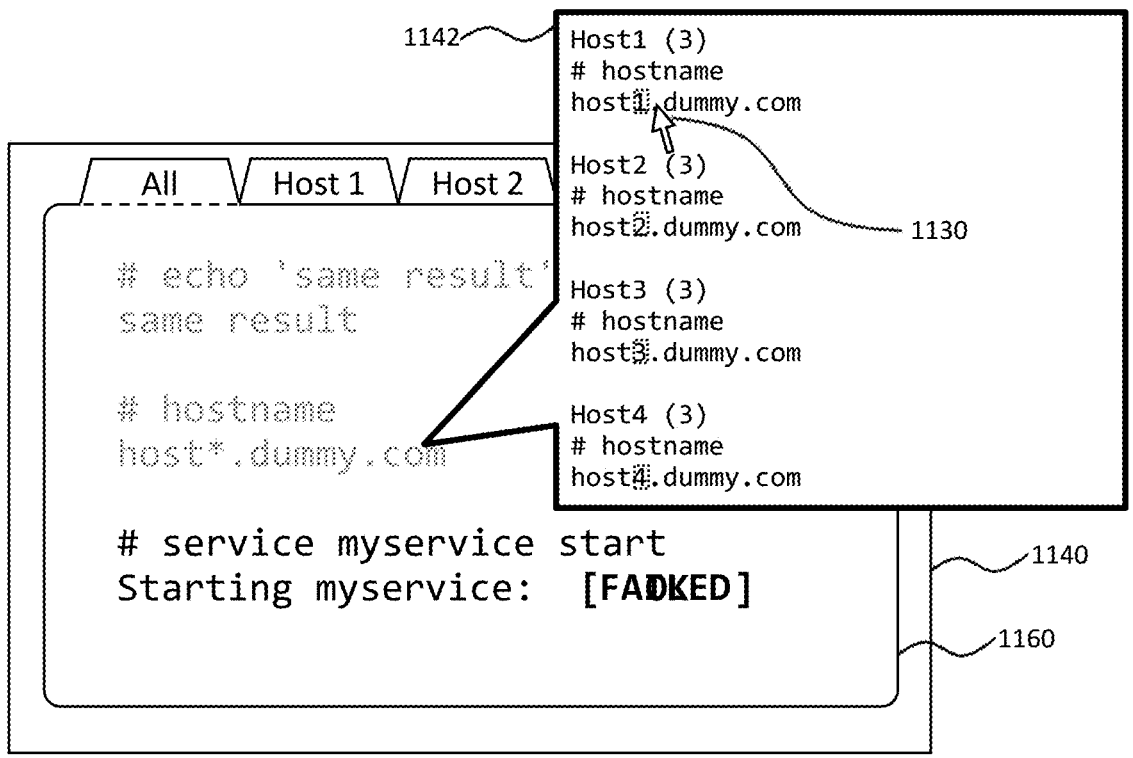
FIG. 11 is a sixth screenshot view showing information that is generated by and/or helpful in understanding embodiments of the present invention.

FIG. 11 shows a display generated in response to a user removing a part of a portion of outputs from comparison through an input unit, such as a mouse, keyboard, etc., according to an embodiment of the invention. A display processing unit, such as the display processing unit 160 of FIG. 1, may specify a part of a portion of outputs that should not be submitted to a comparison, such as in S220 in FIG. 2. In this embodiment, the display processing unit receives a designation of a part of a portion of the outputs that should not be compared, from the user through the follow-up window 1142. For example, the display processing unit receives designation of a number, a name, a date, a time, etc., included in a portion of the outputs as the part that should not be compared.

In the embodiment of FIG. 11, the user has designated a numerical part "*" of the "host*.dummy com" portion by selecting the number "1" in the "hostname" portion of the output of Host 1 in the follow-up window 1142 using a cursor 1130. In response, the display processing unit encompasses the numerical part "*" of the "host*.dummy com" portion of the output of each Host 1-4 in dotted boxes, thereby indicating that the numerical part "*" of the "host*.dummy com" portion of the outputs is removed from comparison. In response, the removal is reflected in the "host*.dummy com" portion of the outputs in an overall view area 1160 in a window 1140.

At S260, an arranging unit, such as the arranging unit 170 of FIG. 1, may determine whether corresponding portions of a subset of outputs have been selected. For example, the arranging unit receives a selection of a subset of the plurality of outputs from a user. In some embodiments, the user may select all or some of the outputs of Hosts 1-4 through the follow-up window 1140 to create the subset of outputs. The arranging unit may receive the selection of the subset of outputs through the follow-up window 1140.

Figure 12:
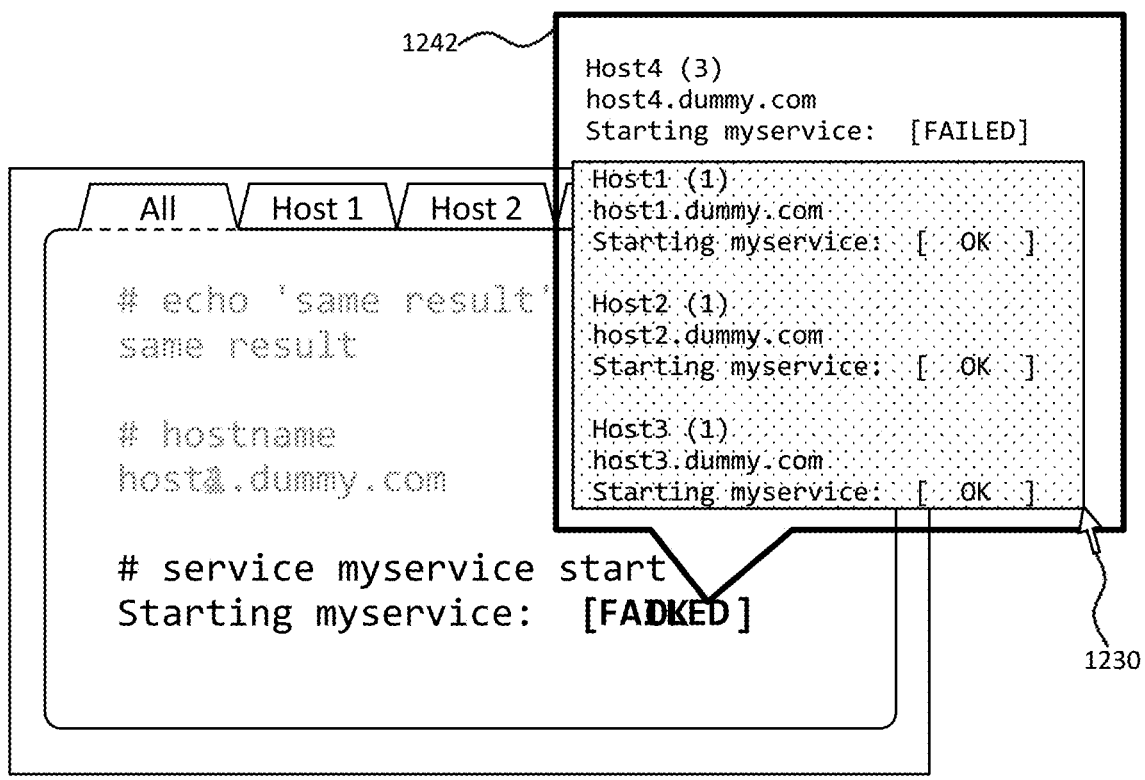
FIG. 12 is a seventh screenshot view showing information that is generated by and/or helpful in understanding embodiments of the present invention.

FIG. 12 shows a display generated in response to a user selecting a subset of outputs, according to an embodiment of the invention. In some embodiments, the user may specify an area using the cursor 1230 such that the specified area includes a plurality of corresponding portions of the outputs of the hosts. In the embodiment of FIG. 12, the specified range includes corresponding portions of the output of hosts 1-3 selected in follow-up window 1242. In response, the arranging unit may receive the selection of the subset of hosts 1-3. In response to a selection of a subset of outputs, an arranging unit may arrange a view area of the subset, such as in S270 of FIG. 2.

At S270 in FIG. 2, the arranging unit may arrange a subset view area for displaying a subset of the plurality of outputs in which individual portions of the plurality of outputs may be emphasized or de-emphasized. The subset of the plurality of outputs may be selected by the user at S270. The display processing unit may generate the subset view area in the same manner as the generation of the overall view area at S230, but only including portions of subset of outputs.

Figures 13, 14A:
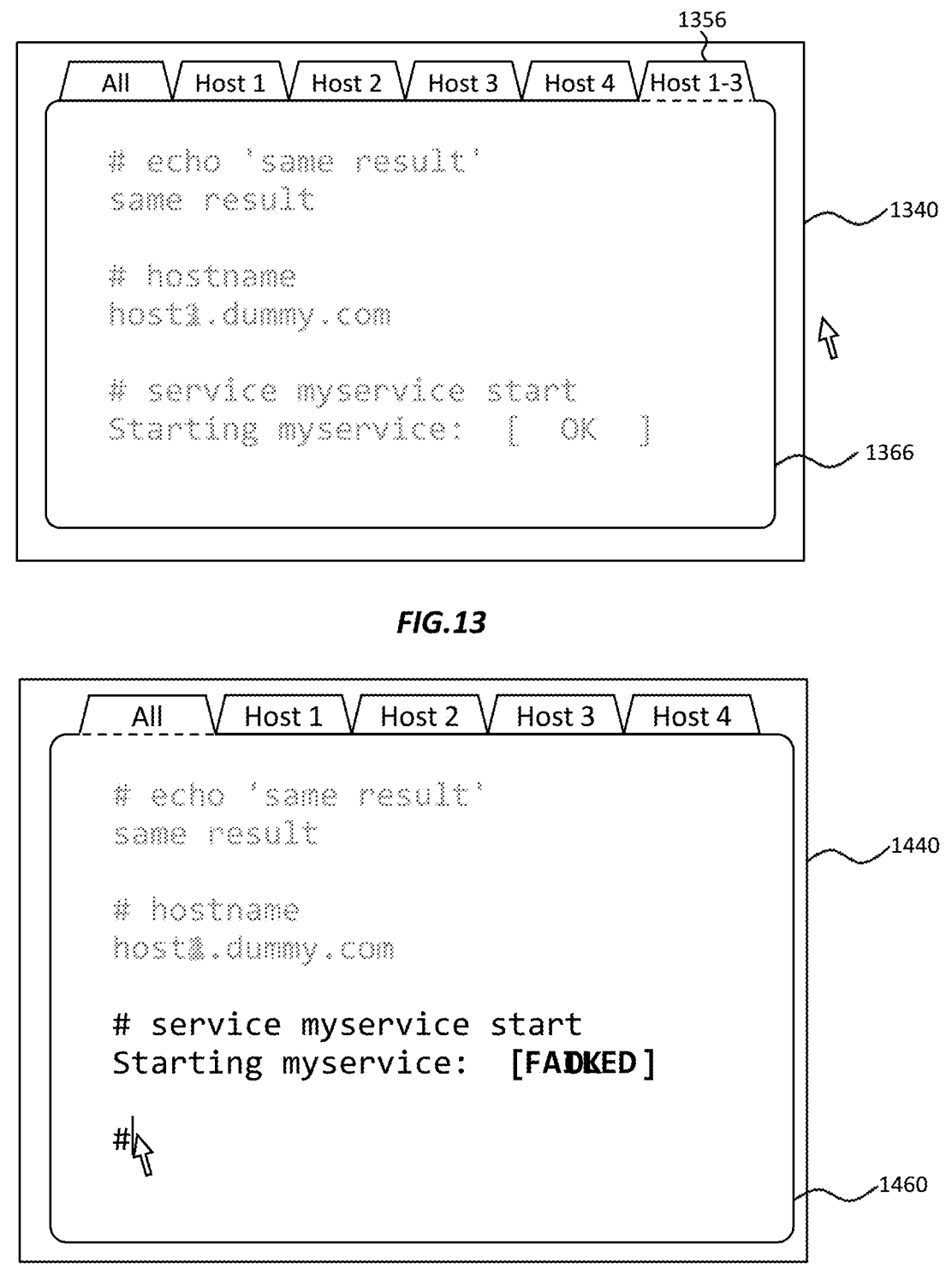

FIG. 13 shows a subset view area 1366 according to an embodiment of the invention. As shown in FIG. 13, a tab 1356 for the subset view area 1366 ("Host 1-3" tab) is selected, and the subset view area 1366 is displayed in a window 1340. In this embodiment, the subset view area 1366 for the subset of Hosts 1-3 includes only a common view because the range of degrees of difference of each portion is within a predetermined amount.

At S280, a command input unit, such as the command input unit 180 of FIG. 1, may determine whether the user has input a command into a view area. The command input unit may receive commands that the user inputs into the overall view area or the subset view area.

FIG. 14A shows a command input by a user in an overall view area 1460 in a window 1440, according to an embodiment of the invention. In the embodiment of FIG. 14A, a display processing unit, such as the display processing unit 160 of FIG. 1, may prompt a user to input a command. The display processing unit may display "#" to notify the user that a command can be entered after "#." The command input unit may provide a feeding unit, such as the feeding unit 190 of FIG. 1, with the command input by the user.

At S290, a feeding unit, such as the feeding unit 190 of FIG. 1, may feed the command received from the command input unit to a plurality of hosts. For example, the feeding unit may feed the command that the user inputs through an overall view area or a subset view area, to the plurality of hosts associated with the outputs included in an overall view area or to a subset of the plurality of hosts associated with outputs included in a subset view area. In response to feeding the command, computing device 10 may move to S210.

In some embodiments of the present invention, the display processing unit generates a display of an identical portion and/or a non-identical portion of each of the plurality of outputs separately.

In some embodiments of the present invention, the display processing unit generates the display of an identical portion and/or a non-identical portion of the plurality of outputs in an overall view area, and generates the display of an identical portion and/or a non-identical portion of each of the plurality of outputs in each of a plurality of single view areas.

In some embodiments of the present invention, an arranging unit operates to arrange a subset view area for displaying an identical portion and/or a non-identical portion of a subset of the plurality of outputs, wherein the subset of the plurality of hosts is selected through an input unit.

In some embodiments of the present invention, the display processing unit generates a display of a non-identical portion by separately showing text in the identical portion of each of the plurality of outputs in response to the non-identical portion being selected.

In some embodiments of the present invention, the comparing unit calculates a degree of difference for each portion of each of the plurality of outputs, wherein the degree of difference of a subject portion of a subject output represents an amount of outputs in which a corresponding portion is different from the subject portion of the subject output, and the display processing unit generates the display in which portions of the plurality of outputs are distinguished in an overall view area based on the degree of difference.

In some embodiments of the present invention, the display processing unit de-emphasizes an identical portion of the plurality of outputs based on the degree of difference. Further, the display processing unit de-emphasizes a display of corresponding portions of the plurality of outputs for which the degrees of difference of the portions of the plurality of outputs are within a predetermined range.

In some embodiments of the present invention, the display processing unit generates a display in which portions of a single output of the plurality of outputs are distinguished in a single view area based on the comparison result of the comparing unit. Accordingly, the display processing unit deemphasizes a display of a portion of the single output for which either the degree of difference of the portion is below a threshold or the degrees of difference of the corresponding portions of the plurality of outputs are within a predetermined range, and emphasizes a display of a portion of the single output for which the degree of difference of the portion is equal to or larger than the threshold and the degrees of difference of the corresponding portions of the plurality of outputs are not within the predetermined range. Further, the display processing unit sets the threshold based on an average of the degrees of difference of the corresponding portions of the plurality of outputs.

Figure 14B:
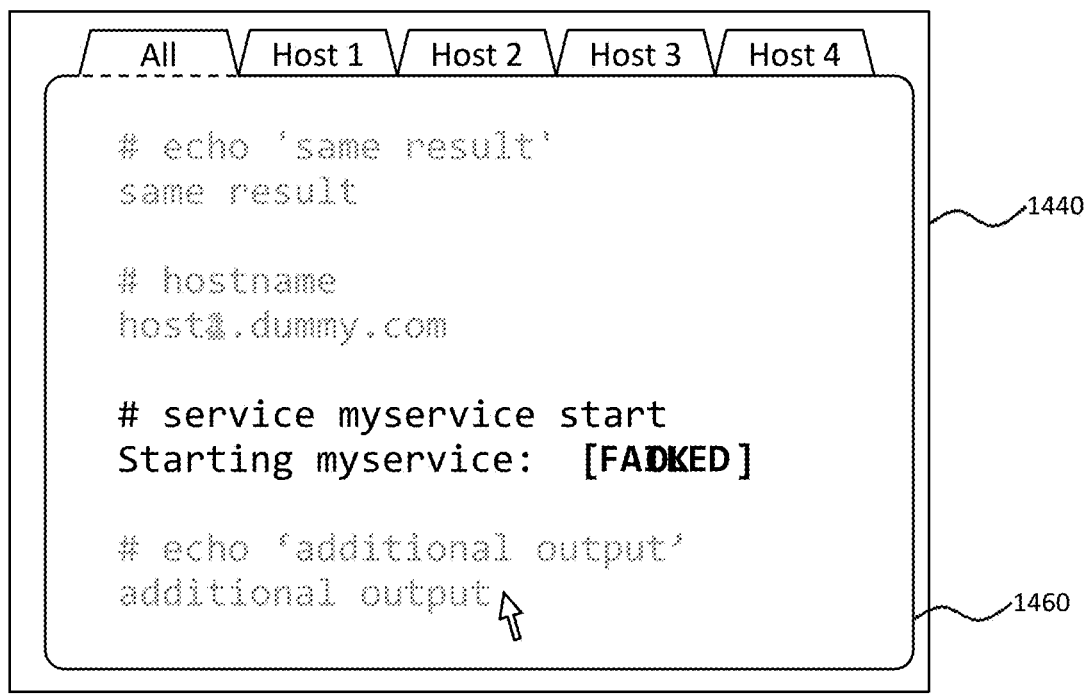
FIG. 14B is a tenth screenshot view showing information that is generated by and/or helpful in understanding embodiments of the present invention.

FIG. 14B shows a command input by the user and the response thereof in an overall view area 1460 in a window 1440, according to an embodiment of the invention. The user may input commands in addition to the outputs displayed on the overall view area. In the embodiment of FIG. 14B, the user has input an "echo 'additional output'" command after the "service myservice start" portion. In response, each host of the plurality of hosts may process the command. A receiving unit, such as the receiving unit 110 of FIG. 1, may receive new outputs in response to the processing of the command, a comparing unit, such as the comparing unit 150 of FIG. 1, may compare the new outputs, and a display processing unit, such as the display processing unit 160 of FIG. 1, may generate an overall view area or a subset view area including a display of the new outputs. As shown in FIG. 14B, the display processing unit has generated a display of the "additional output" portions from the outputs of hosts 1-4 using light characters.

In other embodiments, instead of receiving a command through the overall view area or the subset view area, a command input unit may input a text (e.g., a command) from the user through a single view area. The feeding unit 190 may feed the command from the user input through the single view area to all hosts or a host associated with the output displayed in the single view area. The hosts that receive the command may process the received command, and the receiving unit may receive the output of the command from the host(s), the comparing unit may compare the new outputs, and the display processing unit may update the single view area in a window to reflect the output(s) from the host(s).

In other embodiments, a command input unit may input a command from the user through a subset view area. The feeding unit 190 may feed the command from the user input through the subset view area to hosts in the subset or all hosts. The hosts that receive the command may process the received command, and the receiving unit may receive the output of the commands from the hosts, the comparing unit may compare the new outputs, and the display processing unit may update the subset view area in a window to reflect the outputs from the hosts in the subset.

Figure 15:
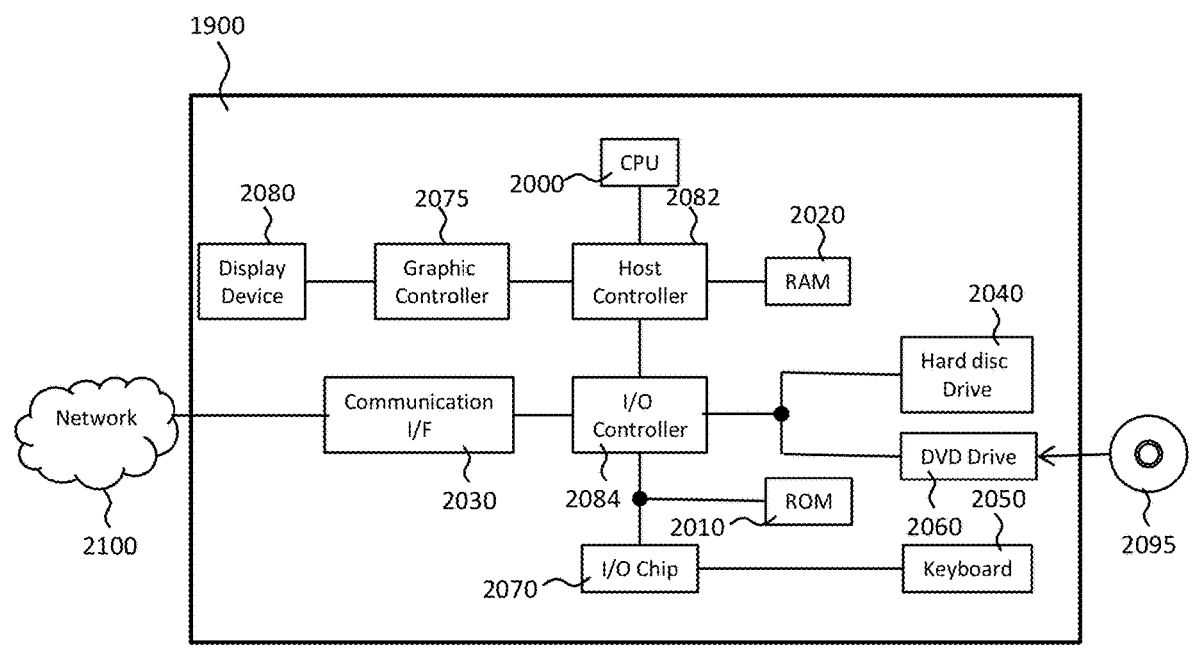
FIG. 15 is a schematic view of a second embodiment system according to the present invention.

FIG. 15 shows an exemplary configuration of a computer system 1900 according to an embodiment of the invention. Computer system 1900 according to the present embodiment includes CPU 2000, RAM 2020, graphics controller 2075, and display device 2080 which are mutually connected by host controller 2082. The computer system also includes input/output units such as communication interface 2030, hard disk drive 2040, and DVD-ROM drive 2060, which are connected to the host controller via input/output controller 2084. The computer system also includes legacy input/output units such as ROM 2010 and keyboard 2050, which are connected to the input/output controller through input/output chip 2070.

Host controller 2082 connects RAM 2020 with CPU 2000 and graphics controller 2075, which access RAM 2020 at a high transfer rate. CPU 2000 operates according to programs stored in ROM 2010 and RAM 2020, thereby controlling each unit. Graphics controller 2075 obtains image data generated by CPU 2000 on a frame buffer or the like provided in RAM 2020, and causes the image data to be displayed on the display device. Alternatively, graphics controller 2075 contains therein a frame buffer or the like for storing image data generated by the CPU.

Input/output controller 2084 connects host controller 2082 with communication interface 2030, hard disk drive 2040, and DVD-ROM drive 2060, which are relatively high-speed input/output units. The communication interface communicates with other electronic devices via network 2100. The hard disk drive stores programs and data used by the CPU within the computer system. DVD-ROM drive 2060 reads the programs or the data from DVD-ROM 2095, and provides the hard disk drive with the programs or the data via the RAM.

ROM 2010, keyboard 2050, and input/output chip 2070, which are relatively low-speed input/output units, are connected to input/output controller 2084. The ROM stores therein a boot program or the like executed by the computer system at the time of activation, a program depending on the hardware of the computer system. The keyboard inputs text data or commands from a user, and provides the hard disk drive 2040 with the text data or the commands via the RAM. The input/output chip connects the keyboard to input/output controller 2084. In some embodiments of the present invention, the input/output chip connects various input/output units via a parallel port, a serial port, a keyboard port, a mouse port, and the like to input/output controller 2084.

A program to be stored on hard disk drive 2040 via RAM 2020 is provided by a recording medium, such as DVD-ROM 2095, and an IC card. The program is read from the recording medium, installed into hard disk drive 2040 within the computer system via RAM 2020, and executed in the CPU.

A program that is installed in the computer system and causes the computer system to function as a computing device, such as computing device 10 of FIG. 1, includes a receiving module, a compare module, a display processing module, an arranging module, an input module, and a feeding module. The program or module acts on the CPU, to cause the computer system to function as a receiving unit, such as receiving unit 110, a comparing unit, such as comparing unit 150, a display processing unit, such as display processing unit 160, an arranging unit, such as arranging unit 170, a command input unit, such as command input unit 180, and a feeding unit, such as feeding unit 190.

The information processing described in these programs is read into the computer system, to function as a receiving unit, a comparing unit, a display processing unit, an arranging unit, an input unit, and a feeding unit, which are the result of cooperation between the program or module and the above-mentioned various types of hardware resources. Moreover, the computing device is constituted by realizing the operation or processing of information in accordance with the usage of the computer system.

For example when communication is performed between computer system 1900 and an external device, CPU 2000 executes a communication program loaded onto RAM 2020, to instruct communication processing to communication interface 2030, based on the processing described in the communication program. The communication interface, under control of the CPU, reads the transmission data stored on the transmission buffering region provided in the recording medium, such as RAM 2020, hard disk drive 2040, or DVD-ROM 2095, and transmits the read transmission data to the network, or writes reception data received from the network to a reception buffering region or the like provided on the recording medium. In this way, the communication interface may exchange transmission/reception data with the recording medium by a DMA (direct memory access) method, or by a configuration that the CPU reads the data from the recording medium or the communication interface of a transfer destination, to write the data into the communication interface or the recording medium of the transfer destination, so as to transfer the transmission/reception data.

In some embodiments of the present invention, CPU 2000 causes all or a necessary portion of the file of the database to be read into RAM 2020, such as by DMA transfer, the file or the database having been stored in an external recording medium, such as hard disk drive 2040, DVD-ROM drive 2060 (DVD-ROM 2095) to perform various types of processing onto the data on the RAM. In that way, the CPU then writes back the processed data to the external recording medium by means of a DMA transfer method or the like. In such processing, the RAM is considered to "temporarily store" the contents of the external recording medium, accordingly, the RAM, the external recording device, and the like are collectively referred to as a memory, a storage section, a recording medium, and/or a computer readable medium. Various types of information, such as various types of programs, data, tables, and/or databases, are stored in the recording device, to undergo information processing. Note that CPU 2000 may also use a part of RAM 2020 to perform reading/writing thereto on the cache memory. In such an embodiment, the cache is considered to be contained in the RAM, the memory, and/or the recording medium unless noted otherwise, since the cache memory performs part of the function of the RAM.

In some embodiments of the present invention, CPU 2000 performs various types of processing, onto the data read from RAM 2020, which includes various types of operations, processing of information, condition judging, and/or search/replace of information, as described in the present embodiment and designated by an instruction sequence of programs, and writes the result back to the RAM. For example, when performing condition judging, the CPU judges whether each type of variable shown in the present embodiment is larger, smaller, no smaller than, no greater than, or equal to the other variable or constant, and when the condition judging results in the affirmative (or in the negative), the process branches to a different instruction sequence, or calls a sub routine.

In addition, the CPU may search for information in a file and/or a database in the recording medium. For example, when a plurality of entries, each having an attribute value of a first attribute is associated with an attribute value of a second attribute, are stored in a recording device, the CPU searches for an entry matching the condition whose attribute value of the first attribute is designated, from among the plurality of entries stored in the recording medium, and reads the attribute value of the second attribute stored in the entry, thereby obtaining the attribute value of the second attribute associated with the first attribute satisfying the predetermined condition.

The above-explained program, or module, may be stored in an external recording medium. Exemplary recording mediums include DVD-ROM 2095, as well as an optical recording medium, such as a Blu-ray Disk or a CD, a magneto-optic recording medium, such as a MO, a tape medium, and a semiconductor memory, such as an IC card. (Note: the term(s) "Blu-ray" and/or "Blu-ray Disk" may be subject to trademark rights in various jurisdictions throughout the world and are used here only in reference to the products or services properly denominated by the marks to the extent that such trademark rights may exist.) In addition, a recording medium, such as a hard disk, or a RAM provided in a server system connected to a dedicated communication network, such as network 2100, or the Internet can be used as a recording medium, thereby providing the program to computer system 1900 via network 2100.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiment(s) of the present invention has (have) been described, the technical scope of the invention is not limited to the above described embodiment(s). It is apparent to persons skilled in the art that various alterations and improvements can be added to the above-described embodiment(s). It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

As made clear from the above, the embodiments of the present invention can be used to realize a computing device (system), a computer-implemented method, and a computer program product.

Some helpful definitions follow:

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer system comprising:
a processor(s) set; and
a non-transitory computer readable storage medium;
wherein:
the processor set is structured, located, connected, and/or programmed to run program instructions stored on the non-transitory computer readable storage medium; and
the program instructions include:
first program instructions programmed to receive a command, the processing of the command generating a character string;
second program instructions programmed to issue to each computer in a set of computers the command for independent processing of the command by each computer;
third program instructions programmed to receive, from the set of computers, a set of character strings responsive to the command;
fourth program instructions programmed to assign a similarity score to each character string, the similarity score representing a relative similarity of the character strings in the set of character strings, each similarity score being determined by:
comparing a scoring character string to each other character string in the set of character strings, wherein the scoring character string and the other character string are generated responsive to the command; and
incrementing in a uniform manner the similarity score for the scoring character string for each other character string that is different than the scoring character string;
fifth program instructions programmed to generate a first display of the first command and identifiers of the set of computers, the display including the assigned similarity scores of each character string received from the set of computers; and
sixth program instructions programmed to generate a second display by overlaying each character string in the set of character strings.

2. The computer system of claim 1, wherein the program instructions further include:
seventh program instructions programmed to input the command as a text string through an overall view area; and
eighth program instructions programmed to feed the text string to each computer in the set of computers.

3. The computer system of claim 1, wherein the program instructions further include:
seventh program instructions programmed to input the command as a text string through a single view area from among a plurality of single view areas; and
eighth program instructions programmed to feed the text string through the single view area to a corresponding computer of the set of computers having the predefined output portion displayed in the single view area.

4. The computer system of claim 1, wherein at least a computer of the set of computers is a virtual machine.

5. The computer system of claim 1, wherein the program instructions further include:
seventh program instructions programmed to emphasize the overlaid character strings if the similarity score assigned to one character string is different from the similarity score assigned to each other character string.

6. A computer program product comprising a non-transitory computer readable storage medium having stored thereon:
first program instructions programmed to receive a command, the processing of the command generating a character string;
second program instructions programmed to issue to each computer in a set of computers the command for independent processing of the command by each computer;
third program instructions programmed to receive, from the set of computers, a set of character strings responsive to the command;

fourth program instructions programmed to assign a similarity score to each character string, the similarity score representing a relative similarity of the character strings in the set of character strings, each similarity score being determined by:
comparing a scoring character string to each other character string in the set of character strings, wherein the scoring character string and the other character string are generated responsive to the command; and
incrementing in a uniform manner the similarity score for the scoring character string for each other character string that is different than the scoring character string;
fifth program instructions programmed to generate a first display of the first command and identifiers of the set of computers, the display including the assigned similarity scores of each character string received from the set of computers; and
sixth program instructions programmed to generate a second display by overlaying each character string in the set of character strings.

7. The computer program product of claim 6, wherein the one computer of the set of computers is a virtual machine.

8. The computer program product of claim 6, wherein the program instructions further include:

seventh program instructions programmed to input the command as a text string through an overall view area; and
eighth program instructions programmed to feed the text string to each computer in the set of computers.

9. The computer program product of claim 6, wherein the program instructions further include:

seventh program instructions programmed to input the command as a text string through a single view area from among a plurality of single view areas; and
eighth program instructions programmed to feed the text string through the single view area to a corresponding computer of the set of computers having the predefined output portion displayed in the single view area.

10. The computer program product of claim 6, wherein the program instructions further include:

seventh program instructions programmed to emphasize the overlaid character strings if the similarity score assigned to one character string is different from the similarity score assigned to each other character string.

* * * * *